United States Patent [19]
Hinkel

[11] Patent Number: 6,056,093
[45] Date of Patent: May 2, 2000

[54] TORQUE CONVERTER WITH A TURBINE SHELL INTEGRATED WITH A TORSIONAL VIBRATION DAMPER

[75] Inventor: Rüdiger Hinkel, Röthlein/Heidenfeld, Germany

[73] Assignee: Mannesmann Sachs AG, Schweinfurt, Germany

[21] Appl. No.: 09/208,149

[22] Filed: Dec. 9, 1998

[30] Foreign Application Priority Data

Dec. 9, 1997 [DE] Germany .............................. 197 54 650

[51] Int. Cl.[7] .................................................. F16H 45/02
[52] U.S. Cl. .......................................... 192/3.29; 192/212
[58] Field of Search ................................ 192/3.28, 3.29, 192/206, 212

[56] References Cited

U.S. PATENT DOCUMENTS

| 5,667,042 | 9/1997 | Olsen et al. .............................. 192/3.29 |
| 5,713,442 | 2/1998 | Murata et al. ........................... 192/3.29 |
| 5,813,505 | 9/1998 | Olsen et al. ........................ 192/3.29 X |
| 5,860,500 | 1/1999 | Olsen et al. .............................. 192/3.29 |

FOREIGN PATENT DOCUMENTS

| 41 35 631 A1 | 4/1992 | Germany . |
| 41 09 485 A1 | 9/1992 | Germany . |
| 196 17 409 A1 | 11/1996 | Germany . |

*Primary Examiner*—Charles A Marmor
*Assistant Examiner*—Saúl Rodriguez
*Attorney, Agent, or Firm*—Cohen, Pontani, Lieberman & Pavane

[57] ABSTRACT

A torque converter includes a converter housing and a turbine wheel arranged in the converter housing and rotatable relative thereto around a rotational axis. The turbine wheel has a turbine wheel shell which has a plurality of turbine blades and a turbine wheel hub connected to the turbine wheel shell. An optional bridge coupling selectively connects the converter housing to the turbine wheel. A torsional vibration damper is connected between the turbine shell and the turbine wheel hub and a coupling mechanism of the bridge coupling is connected to the turbine wheel for torque transmission via the torsional vibration damper. The turbine shell forms a component of the torsional vibration damper.

16 Claims, 3 Drawing Sheets

TORQUE CONVERTER WITH A TURBINE SHELL INTEGRATED WITH A TORSIONAL VIBRATION DAMPER

BACKGROUND OF THE INVENTION

1. Field of the Invention

The present invention relates to a torque converter comprising a converter housing and a turbine wheel arranged in the converter housing so as to be rotatable relative thereto around a rotational axis, a torsional vibration damper, and an optional bridge coupling. The turbine wheel includes a turbine wheel shell which carries a plurality of turbine blades and a turbine wheel hub connected to the turbine wheel shell. The optional bridge coupling selectively connects the converter housing and the turbine wheel in a substantially rotation-proof connection. Torque applied to the turbine wheel hub from the turbine wheel shell and/or, as applicable, the bridge coupling is conducted by the torsional vibration damper.

2. Description of the Related Art

A German prior art reference DE 41 35 631 A1 discloses a prior art torque converter, in which a separate torsional damper is arranged between the turbine wheel and a piston of the bridge coupling. One sode of the damper is attached by suitable attachment elements to the piston and the other side of the damper is attached to the turbine wheel. This type of torque converter requires a relatively large structural space for the torsional vibration damper and also necessitates additional components for connecting the torsional vibration damper to various converter parts.

Another German prior art reference DE 41 09 485 A1 discloses a prior art torque converter in which the piston of the bridge coupling functions as a covering sheet for the torsional vibration damper. Here, too, an additional element for transmitting the torque is required.

Yet another German prior art reference DE 196 17 409 A1 discloses a prior art torque converter in which the piston of the bridge coupling functions as a hub element of the torsional vibration damper. A problem with this device is that the piston displacement required to close the bridge coupling can impair the function of the torsional vibration damper.

SUMMARY OF THE INVENTION

The object of the present invention is to create a torque converter with a torsional vibration damper that has a simple structure, requires only a small structural space for the torsional vibration damper, and has an unimpaired operation of the vibration damping function of the torsional vibration damper.

The object of the present invention is attained by a torque converter having a converter housing, a turbine wheel that is arranged in the converter housing so as to be rotatable relative thereto around a rotational axis, a torsional vibration damper, and an optional bridge coupling for selectively connecting the turbine wheel to the converter housing in a substantially rotation-proof connection. The turbine wheel has a turbine wheel shell which carries a plurality of turbine blades as well as a turbine wheel hub. The torsional vibration damper conducts torque directed to the turbine wheel hub from the turbine wheel shell and/or, as applicable, the bridge coupling.

In the torque converter according to the invention, the turbine shell is a component of the torsional vibration damper.

Thus, the structural space required for the torsional vibration damper is reduced in the torque converter according to the invention because of the incorporation of the turbine wheel shell into the function and structure of the torsional vibration damper. Since it is not necessary to move the turbine wheel shell to activate the bridge coupling (as is necessary, for example, in the case of a piston), the function of the torsional vibration damper is not impaired by the incorporation therein of the turbine wheel shell.

Furthermore, the number of required components is reduced because no additional connection elements are required for connecting the torque converter to the turbine wheel.

In the torque converter according to the invention, it is possible, for example, for the torsional vibration damper to comprise a hub element and covering elements arranged on both sides of the hub element, whereby the covering elements are securely connected to each other and are movable relative to the hub element around the rotational axis. A torsional damping spring arrangement with at least one spring unit comprising at least one spring acts between the covering elements, on one side, and the hub element, on the other, for damping torsional vibrations. The turbine wheel shell forms one of the covering elements.

For torque transmission between the hub element and the covering elements by the torsional damping spring arrangement, control regions that border spring apertures are created on the covering elements and on the hub element to support a given end of a spring of the torsional damping spring arrangement. The control regions on the first covering sheet are formed by axially and/or radially offset and preferably impressed regions of the turbine wheel shell.

To ensure that the springs of the torsional damping spring arrangement, which springs extend substantially in the circumferential direction, are reliably positioned even at high speeds, it is proposed that a spring guide section extending substantially in the circumferential direction be provided on the first covering sheet radially inside and/or radially outside between two control regions, each of which borders a spring aperture.

The spring guide section is preferably formed by a curved area on the turbine wheel shell.

To achieve a secure connection between the two covering elements without additional components, it is proposed that at least some of the turbine blades have connecting projections, which penetrate openings in the turbine wheel shell and are designed, in the area of their respective free ends, to be securely connected to the other covering element.

Thus, it is possible for at least one connecting projection to penetrate an opening in the hub element with movement clearance in the circumferential direction. In this way, the one or more connection projection also forms a rotational angle limit for the torsional vibration damper.

At least one connecting projection, in its connection area to the other covering element, has at least one support shoulder for supporting the other covering element.

The torsional vibration damper component group formed by the two covering elements may be connected in rotation-proof fashion to a coupling mechanism of the bridge coupling. In a preferred embodiment, the torsional vibration component group is connected to a coupling piston.

According to a further aspect of the present invention, a radial projection provided fixedly on the turbine wheel hub forms the hub element of the torsional vibration damper. If the radial projection constitutes an integral part of the turbine wheel hub, the number of parts needed to construct the torque converter according to the invention is further reduced.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
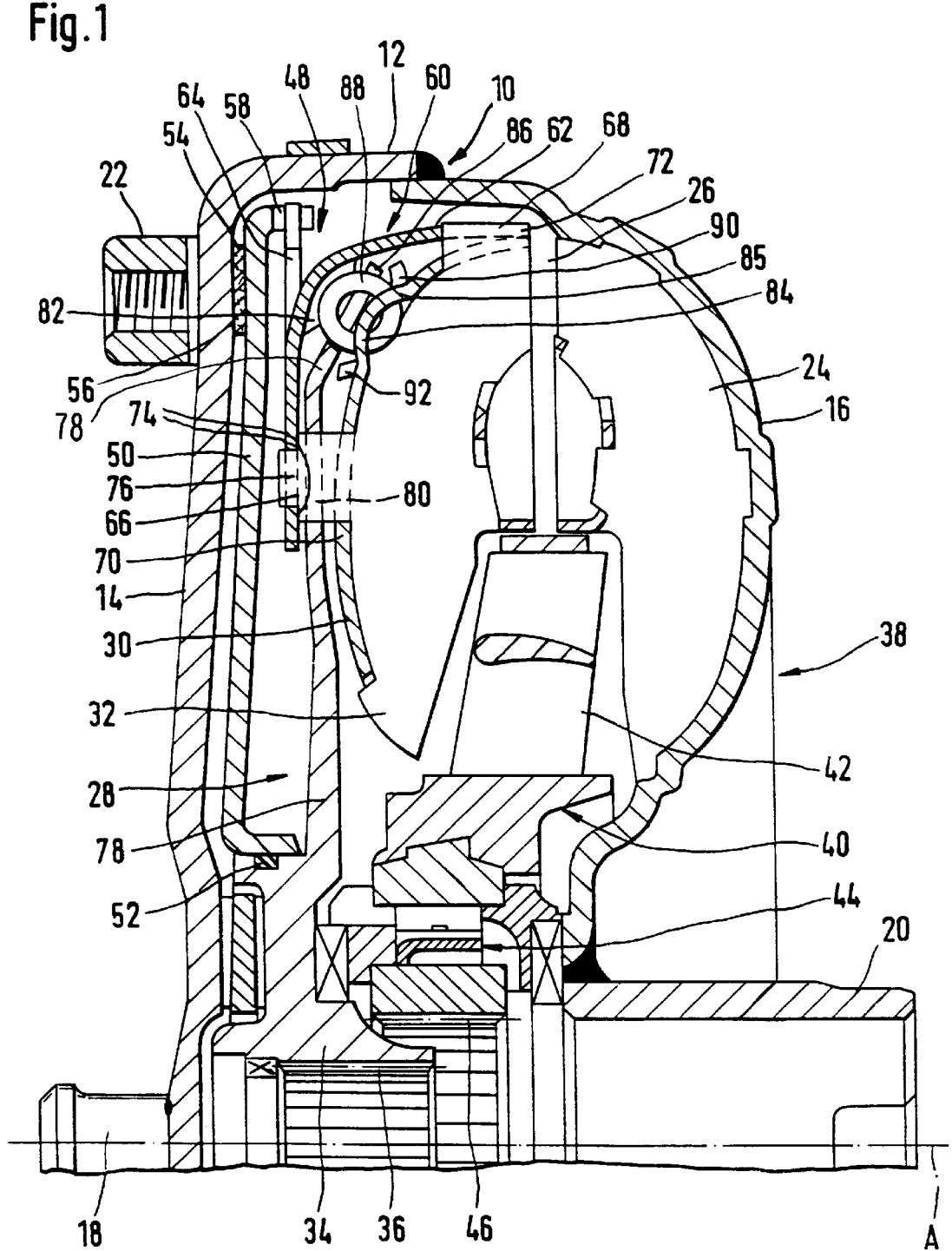
FIG. 1 is a partial longitudinal sectional view of a torque converter according to an embodiment of the present invention.

FIG. 1 shows a torque converter 10 with a converter housing 12. The converter housing 12 includes a converter cover 14 and a pump wheel shell 16, which are securely connected to each other in a radially outer region, for example, by welding. The radially inner portions of the cover 14 and the pump shell 16 are securely connected to respective hubs 18, 20. The cover 14 includes multiple circumferentially distributed coupling elements 22 (only one is shown in FIG. 1) for attaching the converter housing 12 to a flex plate or other element connected to an output shaft of an output assembly. The pump shell 16 includes a plurality of circumferentially distributed pump blades 24. The pump shell 16 and hub 20 form a pump wheel 38.

A turbine wheel 28 is mounted in an interior 26 of the converter housing 12. The turbine wheel 28 includes a turbine wheel shell 30 and a plurality of circumferentially distributed turbine wheel blades 32 attached thereto, for example, by soldering or welding. The turbine wheel 28 also comprises a turbine wheel hub 34 connected as described below to the turbine wheel shell 30 and connectable to a converter output shaft in rotation-proof fashion via an internal toothing 36.

A guide wheel 40 with a plurality of guide wheel blades 42 is mounted between the turbine wheel 28 and the pump wheel 38. The guide wheel 40 is carried via a free-wheeling mechanism 44 on a guide wheel hub 46.

The torque converter 10 further comprises a bridge coupling 48 for selectively connecting the turbine wheel 28 to the converter housing in a substantially rotation-proof manner. In the embodiment shown, the bridge coupling 48 comprises a piston 50 as a coupling mechanism having a radially inner portion rotatably mounted on the turbine wheel hub 34 and an intermediate mounting of a sealing ring 52. The radially outer side of the piston 50 carries a friction lining 54 which can be brought to rest on a counter friction surface 56 on the cover 14. An increase in pressure in the converter interior 26 causes the piston 50 to be axially pressurized and pressed toward the converter cover 14, so that the friction lining 54 is pressed against the counter friction surface 56 on the cover 14, thereby connecting the turbine wheel 28 to the converter housing 12.

In the radially outer region, the piston 50 has multiple carrier projections 58, which may form a toothing, and with which the piston 50 is connected in rotation-proof fashion to a torsional vibration damper 60, described in further detail herebelow.

The torsional vibration damper 60 has a first component group that, in tractive operation, forms an input component group including a covering disk element 62 with projections 64 that engage the projections 58 on the piston 50 to establish a rotation-proof connection between the piston 50 and the torsional vibration damper 60 and a second covering disk element formed by the turbine shell 30. A permanent connection between the covering disk element 62 and the turbine shell 30 is established by connection sections 66, 68 which are connected to some of the turbine blades 32. The connection sections 66, 68 penetrate respective openings 70, 72 in the turbine shell 30 and, in their free end region, are securely connected to the covering disk element 62. The connection sections 66, 68 may comprise, for example, in the region of their free end, a support shoulder 74 for the covering disk element 62. This is illustrated in the case of the connection section 66 which is arranged in the radially central area of the turbine blades 32, for example. The region of the connection section 66 (and of other connection sections as well) projecting past the shoulder 74 penetrates a corresponding opening 76 in the covering disk element 62 and, at its free end, is securely connected by means of rolling, welding, preferably laser welding, or the like to the covering disk element 62, which is preferably embodied as a sheet metal part.

A radial flange 79 protrudes radially outward from the turbine wheel hub 34 and is embodied integrally with the turbine wheel hub 34. A radially outer region of flange 79 extends between the covering disk element 62 and the turbine shell 30 to form a hub element 78 for the torsional vibration damper 60. In the region of each of the connection sections 66 arranged in the radially central section, the hub element 78 has an opening 80 extending in the circumferential direction, which is penetrated by a connection section 66 and holds the latter with circumferential movement clearance. Thus, the interaction of the connection section 66 with the associated openings 80 creates a rotational distance limit for the torsional vibration damper 60. In the hub element 78 as well as in the covering disk element 62 or turbine wheel hub 30, there are spring apertures, which are bordered by control regions 82, 84, 86 directed toward each other in the circumferential direction. The control regions 82, 84, 86 provide circumferential support for springs 88. More than one spring 88 may be distributed circumferentially and then constitute a torsional damping spring arrangement. Each spring 88 is arranged in an associated spring aperture with associated control regions that circumferentially border the spring aperture. Depending on the direction in which torque is introduced, each spring 88 rests with one end on the hub element 78 or control region 86, while the other spring end rests on the covering disk element 62 or turbine wheel shell 30 in the control regions 82, 84. The relative positions of the control regions located on the covering disk element 62 and the turbine wheel shell 30 are arranged such that the control region pairs embodied on there two elements are aligned in the circumferential direction, so that an end of the spring 88 can rest evenly on the two control regions.

As the drawing shows, the control regions 84, 82 on the covering disk element 62 and the turbine wheel shell 30 are formed by the impression or axial and/or radial offset of surface area 85 of these elements. Therefore, no additional elements are needed to create the control regions 84, 82. The drawing also shows that the turbine wheel shell 30 has curved regions 90, 92, which extend along the spring apertures in the circumferential direction and thus form a guide for the spring 88 in its longitudinal area. Because the covering disk element 62 is curved on the radial outside around the spring 88 or springs 88, no guide is required.

If the connection section 66 and associated opening 80 are provided on each turbine blade 32, the rotational angle of movement of the hub element with respect to the covering disk element 62 an the turbine wheel shell 30 is limited by the space between adjacent turbine blades 32. Thus, to avoid placing too much of a limit on the rotational angle permitted in the torsional vibration damper 60 between the covering disk element 62 and the turbine wheel shell 30, on the other hand, and the hub element 78, on the other, the connection section 66 that penetrates an opening 80 in the hub element 98 is preferably not provided on every turbine blade 32. Furthermore, it is possible for the opening 80 in the hub element 78 to have such a large circumferential extension that two or more projections 66 extend into it.

In FIG. 1, the turbine blades 32 with the connection sections 66 and 68 are shown as having two connection sections. However, it is equally possible for more than two connection sections to be embodied on the blades 32 or, for example, for only the connection section 66 to be provided. In the latter embodiment, the connection between the covering disk element 62 and the turbine shell 30 in the radially outer area may be established by welding these two components together directly.

The torque converter 10 according to the invention achieves an extremely compact structure because the turbine wheel shell 30 directly constitutes part of the torsional vibration damper and because the turbine wheel hub 34 with its radial projection 78 also directly constitutes part of the torsional vibration damper 60. In addition to advantageously occupying a small structural space, the invention allows the number of parts to be reduced, while the torsional vibration damper can nonetheless carry out an unlimited vibration damping function.

Different variations of the inventive torque converter are possible. For example, it is possible for the torsional vibration damper 60, and particularly its springs 88, may be moved radially farther outward or radially farther inward, so that the impressions 85 forming the respective control regions are located on the radially inner region of the turbine shell 30.

In the embodiment of the torque converter shown in FIG. 1, the torsional vibration damper 60 provides a torsional vibration damping function in the force transmission path between the converter housing and the turbine wheel hub when the bridge coupling 48 is in its engaged state and, provides a torsional vibration damping function between the turbine blades and the turbine wheel hub regardless of whether the bridge coupling 48 is in the engaged or disengaged state. Therefore, the torsional vibration dampers acts as a turbine damper, so that even in normal operation, in which the torque converter performs its torque conversion function by the disengagement of the bridge coupling 48, the occurrence of torsional vibrations in the drive train are damped by the torsional vibration damper 60, in addition to being damped by the working fluid in the converter interior itself.

The advantages of the structure of the torque converter according to the invention or of the torsional vibration damper mounted therein may also be attained by other embodiments. For example, by riveting, welding or the like, to the turbine wheel hub, and for the torsional damping hub, instead of being connected to the turbine wheel hub, to be connected to the piston of the bridge coupling or to another part of the bridge coupling.

Figure 2:
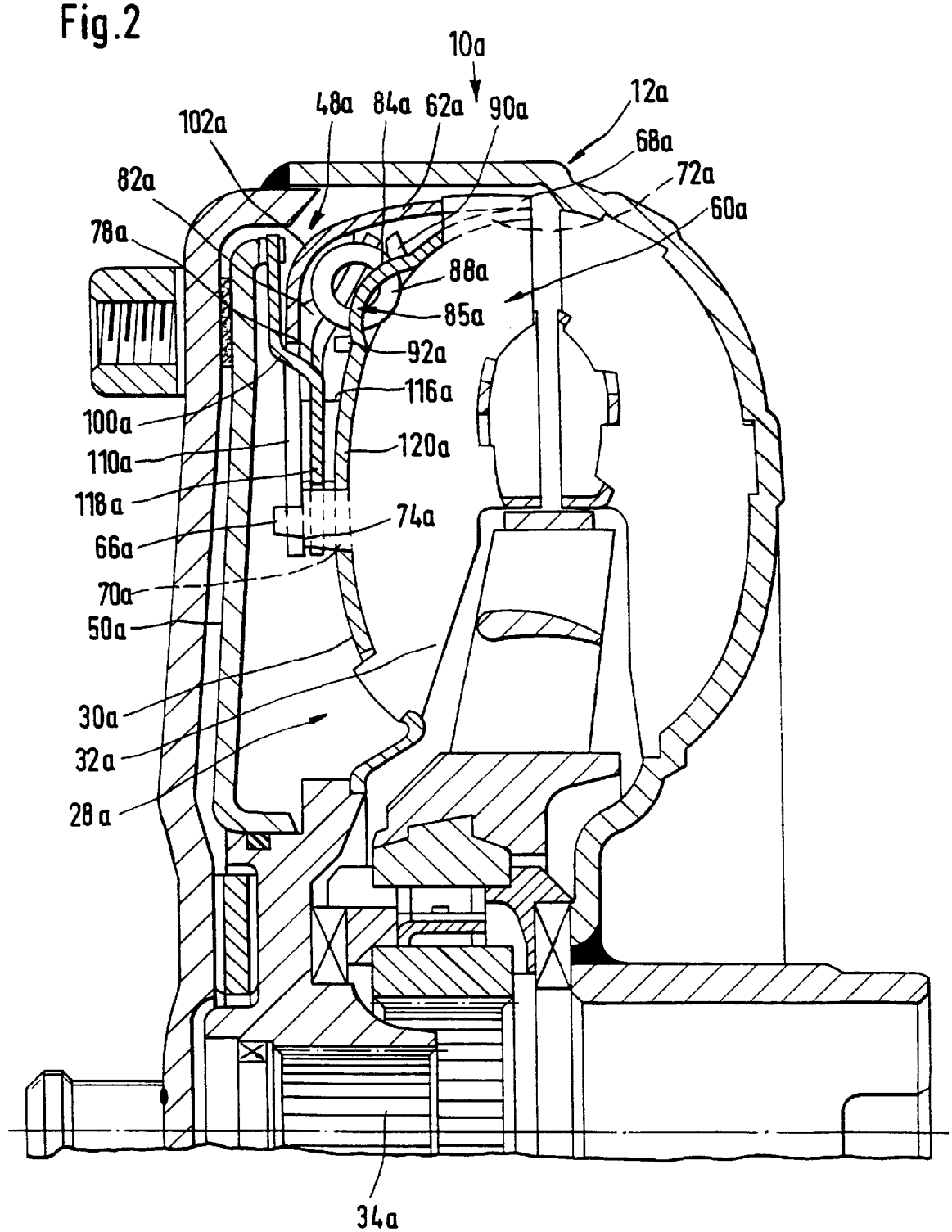
FIG. 2 is a partial longitudinal sectional view of a torque converter according to another embodiment of the present invention.
Figure 3:
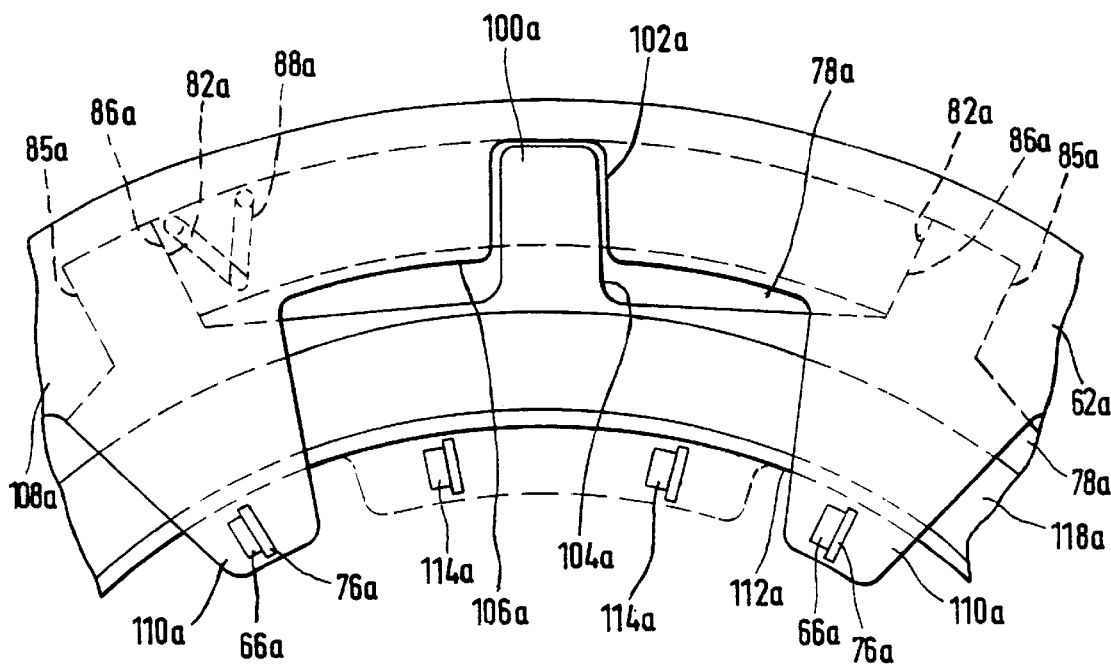
FIG. 3 is an axial view of the torsional vibration damper of the torque converter in FIG. 2.

FIGS. 2 and 3 show different views of an alternative embodiment of a torque converter according to the invention. Components that correspond to those shown in FIG. 1 are identified by the same reference numbers with an added suffix "a". Modifications of the embodiment in FIG. 1 that are relevant to the present invention are discussed below.

In the embodiment of FIGS. 2 and 3, the hub element 78*a* of the torsional vibration damper 60*a* is connected to a component of the bridge coupling 48*a*, which, in this embodiment, is a piston 50*a*. As a result, the torsional vibration damper 6*a* acts directly between the bridge coupling 48*a* the turbine wheel shell 30*a* of the turbine wheel 28*a*. As in the embodiment of FIG. 1, the turbine wheel shell 30*a* with its impressed regions 85*a* again constitutes one of the covering elements of the torsional vibration damper 60*a* with the other covering element 62*a* comprising a separate part. The hub element 78*a* has tongue-like carrier projections 100*a* at various circumferential areas, which curve toward the bridge coupling 48*a* from the hub element 78*a* in the axial direction and then run radially outward. The tongue-like carrier projections 100*a* engage the piston 50*a* of the bridge coupling 48*a*, so that the hub element 78*a* is held in a rotation-proof manner relative to the piston 50*a*. Referring to FIG. 3, the covering element 62*a* has an opening 102*a* for each tongue 100*a*, extending slightly radially outward past the radially outer region of the given tongue 100*a*, thereby permitting the tongues to be moved axially past the covering element 62*a*. Further, FIG. 3 shows that the curved area 104*a* of each tongue 100*a* is formed radially inside an inner edge 106*a* of a ring section 108*a* of the covering element 62*a*. This arrangement prevents the tongues 100*a* from striking a lateral end region of the openings 102*a* upon relative rotation between the covering element 62*a* and the hub element 78*a*.

FIG. 3 shows that the openings 102*a* extend circumferentially between two radially inwardly extending attachment sections 110*a* of the covering element 62*a*. In interaction with the tongues 100*a*, the attachment sections 110*a* thus form a rotational angle limit for the torsional vibration damper 60*a*. An alternative embodiment for the rotational angle limit is shown in FIG. 3, where radial projections 114*a* (indicated by broken lines) which project radially inwardly from an inner circumferential edge 112*a* of the hub element 78*a* are able, for the purpose of rotational angle limitation, to strike the connection projections 66*a* of the turbine blades 32*a*, which are connected to the attachment sections 110*a* by rolling or the like.

FIG. 3 also shows that connection sections for connection to the covering element 62*a* are not provided on all turbine blades 32*a*. For example, between two connection projections 66*a* connected to the covering element 62*a*, two projections 114*a* for connecting the associated turbine blades 32*a* to the turbine shell 30*a* may be bent or rolled.

Moreover, FIGS. 2 and 3 show that between the hub element 78*a* and the turbine shell 30*a* and between the hub element 78*a* and the covering element 62*a*, friction linings 116*a*, 118*a* are held in rotation-proof fashion on one of the two elements, for example, the hub element 78*a*. Upon relative rotation between the hub element 78*a* and the covering element 62*a* or the turbine shell 30*a*, one of the friction elements 116a, which can be embodied as friction rings or the like, rubs against the other element and produces a friction damping force. To obtain sufficient radial structural space for the friction elements 118a and 116a, the connection projections 66a of the turbine blades 32a are moved farther radially inward, compared with the embodiment in FIG. 1, so that the connection projections 66a are followed radially by a section 120a, extending radially outward in approximately straight line, of the turbine shell 30a, on which the friction element 116a can be arranged.

The friction element 118a acts between the hub element 78a and the attachment section 110a of the covering element 62a. In an advantageous embodiment, friction element 118a is secured to the attachment sections 110a while allowing the friction element 118a to slide on the hub element 78a. Doing so creates a clearly enlarged friction action surface in the circumferential area. Otherwise, the friction element 118a would only rub against the short area of the attachment sections 110a in the circumferential direction.

Stampings or domed areas directed toward the turbine shell 30a, which press the friction elements 118a, 116a between the covering element 62a and the turbine shell 30a, with the intermediate bearing of the hub element 78a, may be embodied on the attachment sections 110a of the covering elements 62a to set a prestress force that acts on the friction elements 118a, 116a.

Compared with the embodiment of FIG. 1, the embodiment of FIGS. 2 and 3 has the advantage that the turbine hub need not be equipped with the flange shown in FIG. 1. Instead, the function of the torsional damper hub is performed by a very simple and economically manufactured sheet metal part.

The invention is not limited by the embodiments described above which are presented as examples only but can be modified in various ways within the scope of protection defined by the appended patent claims.

I claim:

1. A torque converter, comprising:
    a converter housing rotatable about an axis of rotation and connected to a pump wheel;
    a turbine wheel rotatably arranged in said converter housing for rotating about said axis of rotation relative to said converter housing, said turbine wheel having a turbine wheel shell with a plurality of turbine blades and a turbine wheel hub; and
    a torsional vibration damper operatively connected between said turbine wheel shell and said turbine wheel hub for transmitting torque from said turbine wheel shell to said turbine wheel hub,
    said torsional vibration damper comprising a first part rotatable about said axis of rotation and a second part rotatable about said axis of rotation and a circumferentially directed spring acting between said first part and said second part,
    wherein said first part comprises a hub element and said second part comprises first and second covering elements fixedly connected to each other and rotatable about said axis of rotation, and wherein said turbine wheel shell is one of said first and second covering elements, and
    wherein each of said first and second covering elements and said hub element comprise control regions operatively arranged for defining a spring aperture in which said spring is circumferentially supported and said control region of said one of said first and second covering elements comprises one of a radially and axially offset region on said turbine wheel.

2. The torque converter of claim 1, wherein one of said first and second covering elements comprises a spring guide section extending circumferentially along one of a radially inner border and a radially outer border of said spring aperture and said spring guide section comprises a curved area of said turbine wheel shell.

3. The torque converter of claim 1, wherein said hub element comprises a radial projection connected to said turbine wheel hub.

4. The torque converter of claim 3, wherein said radial projection comprises an integral part of said said turbine wheel hub.

5. A torque converter, comprising:
    a converter housing rotatable about an axis of rotation and connected to a pump wheel;
    a turbine wheel rotatably arranged in said converter housing for rotating about said axis of rotation relative to said converter housing, said turbine wheel having a turbine wheel shell with a plurality of turbine blades and a turbine wheel hub; and
    a torsional vibration damper operatively connected between said turbine wheel shell and said turbine wheel hub for transmitting torque from said turbine wheel shell to said turbine wheel hub,
    said torsional vibration damper comprising a first part rotatable about said axis of rotation and a second part rotatable about said axis of rotation and a circumferentially directed spring acting between said first part and said second part,
    wherein said first part comprises a hub element and said second part comprises a first and second covering elements fixedly connected to each other and rotatable about said axis of rotation, and wherein said turbine wheel shell comprises one of said first and second covering elements, and
    wherein each of said first and second covering elements and said hub element comprise control regions operatively arranged for defining a spring aperture in which said spring is circumferentially supported and said control region of said one of said first and second covering elements comprises one of a radially and axially offset region on said turbine wheel shell; and
    a connection projection mounted on one of said turbine blades and penetrating an opening in said turbine wheel shell, wherein a free end of said connection projection is fixedly connected to the other of said first and second covering elements.

6. The torque converter of claim 5, wherein said connection projection penetrates an opening in said hub element, said hole in said hub element providing clearance for circumferential movement of said connection element with respect to said hub element.

7. The torque converter of claim 5, wherein said connection element has a support shoulder for supporting said other of said first and second covering element.

8. A torque converter, comprising:
    a converter housing rotatable about an axis of rotation and connected to a pump wheel;
    a turbine wheel rotatably arranged in said converter housing for rotating about said axis of rotation relative to said converter housing, said turbine wheel having a turbine wheel shell with a plurality of turbine blades and a turbine wheel hub;
    a bridge coupling operatively connected between said turbine wheel and said converter housing for selectively connecting said turbine wheel and said converter housing; and a torsional vibration damper operatively connected between said turbine wheel shell and said turbine wheel hub for transmitting torque from one of said bridge coupling and said turbine wheel shell to said turbine wheel hub, said torsional vibration damper comprising a first part rotatable about said axis of rotation, a second part rotatable about said axis of rotation, and a circumferentially directed spring action between said first part and said second part, wherein said first part comprises a hub element and said second part comprises first and second covering elements fixedly connected to each other and rotatable about said axis of rotation, and wherein said turbine wheel shell is one of said first and second covering elements, and wherein each of said first and second covering elements and said hub element comprise control regions operatively arranged for defining a spring aperture in which said spring is circumferentially supported and said control region of said one of said first and second covering elements comprises one of a radially and axially offset region on said turbine wheel shell.

9. The torque converter of claim 8, wherein one of said first and second covering elements comprises a spring guide section extending circumferentially along one of a radially inner border and a radially outer border of said spring aperture and said spring guide section comprises a curved area of said turbine wheel shell.

10. The torque converter of claim 8, wherein said hub element comprises a radial projection connected to said turbine wheel hub.

11. The torque converter of claim 10, wherein said radial projection comprises an integral part of said turbine wheel hub.

12. The torque converter of claim 8, wherein said bridge coupling comprises a coupling mechanism for selectively connecting said turbine wheel and said converter housing, and wherein said second part of said torsional vibration damper is rotatably fixedly connected to said coupling mechanism.

13. The torque converter of claim 8, wherein said bridge coupling comprises a coupling mechanism for selectively connecting said turbine wheel and said converter housing, and wherein said first part of said torsional vibration damper is rotatably fixedly connected to said coupling mechanism.

14. A torque converter, comprising:

a converter housing rotatable about an axis of rotation and connected to a pump wheel;

a turbine wheel rotatably arranged in said converter housing for rotating about said axis of rotation relative to said converter housing, said turbine wheel having a turbine wheel shell with a plurality of turbine blades and a turbine wheel hub;

a bridge coupling operatively connected between said turbine wheel and said converter housing for selectively connecting said turbine wheel and said converter housing; and a torsional vibration damper operatively connected between said turbine wheel shell and said turbine wheel hub for transmitting torque from one of said bridge coupling and said turbine wheel shell to said turbine wheel hub, said torsional vibration damper comprising a first part rotatable about said axis of rotation, a second part rotatable about said axis of rotation, and a circumferentially directed spring acting between said first part and said second part, wherein said first part comprises a hub element and said second part comprises first and second covering elements fixedly connected to each other and rotatable about said axis of rotation, and wherein said turbine wheel shell comprises one of said first and second covering elements, and wherein each of said first and second covering elements and said hub element comprise control regions operatively arranged for defining a spring aperture in which said spring is circumferentially supported and said control region of said one of said first and second covering elements comprises one of a radially and axially offset region on said turbine wheel shell a connection projection mounted on one of said turbine blades and penetrating an opening in said turbine wheel shell, wherein a free end of said connection projection is fixedly connected to the other of said first and second covering elements.

15. The torque converter of claim 14, wherein said connection projection penetrates an opening in said hub element, said hole in said hub element providing clearance for circumferential movement of said connection element with respect to said hub element.

16. The torque converter of claim 14, wherein said connection element has a support shoulder for supporting said other of said first and second covering elements.

* * * * *